Jan. 30, 1940.                H. W. GRINTER                2,188,434
                METHOD FOR ADHERING RUBBER TO METAL
                       Filed Sept. 9, 1936
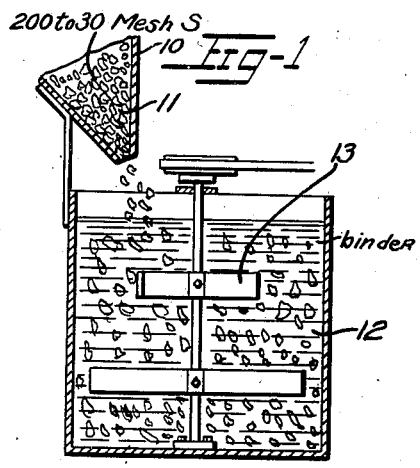
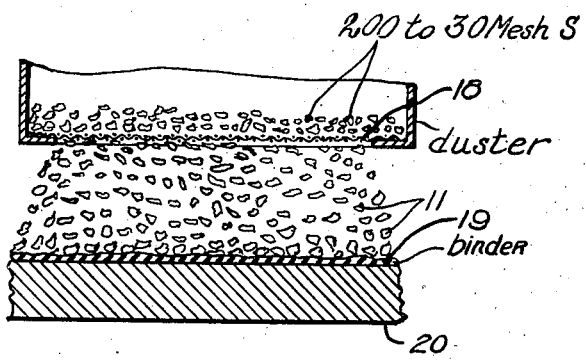
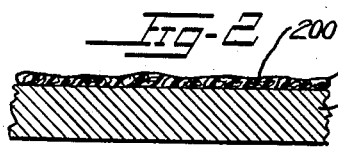
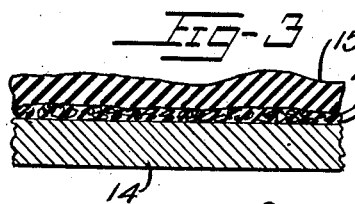
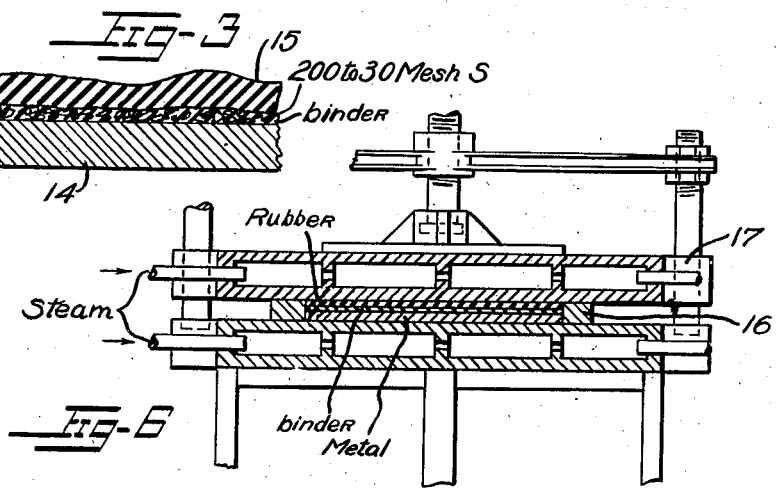
Inventor
Hershel W. Grinter
By Willis F. Avery
Atty Patented Jan. 30, 1940

2,188,434

UNITED STATES PATENT OFFICE 2,188,434

METHOD FOR ADHERING RUBBER TO METAL

Hershel W. Grinter, Cuyahoga Falls, Ohio, assignor to The B. F. Goodrich Company, New York, N. Y., a corporation of New York Application September 9, 1936, Serial No. 100,035

7 Claims. (Cl. 154—2)

My invention relates to a new method of causing rubber to adhere to metal.

It is an important object of my invention to provide a method for regulating the availability of sulfur of large particle size at the interface between rubber and the metal surface to which it is to adhere so that the adhesion may be greatly improved.

The problem of causing rubber to adhere firmly and permanently to metal has long been a difficult one. It has been shown that the type of rubber and the accelerator, pigments, and softeners used in the stock affect the adhesion of rubber to metal. But even when these factors were closely controlled, bad adhesion was encountered in many cases. I have discovered that sulfur is the essential ingredient which causes rubber to adhere to metal. Furthermore, the particle size of the sulfur must be coarser than 200 mesh to secure the best results, and the sulfur must be available at the interface between the rubber and the metal. In carrying out the method of my invention, the clean metallic surface is coated with a binder such as rubber cement. Sulfur of the proper particle size may be dusted on the rubber cement after it has been applied to the metal, mixed into the rubber cement before it has been applied to the metal, or milled into the rubber before it is made into cement. The dusting method usually gives the best results, while the milling method is the least preferable. A rubber composition is then applied, and the assembled product is subjected to heat and pressure.

Sulfur, ninety percent of which will pass a 200 mesh screen, is commonly used in the rubber industry. This is too fine to cause the best adhesion. In all the adhesion experiments made testing this method, sulfur which would not pass a 200 mesh screen gave the best results. Some cases required even coarser sulfur. For best adhesion between brass and a rubber stock containing tetramethyl thiuram disulfide as an accelerator, 100 to 30 mesh sulfur was used.

The invention may be better understood from the accompanying drawing, of which

Fig. 1 is a section representing the incorporation of sulfur in the binder.

Fig. 2 is a section representing the metal with the sulfur-containing binder applied;

Fig. 3 is a section representing rubber applied to the sulfur-containing binder;

Fig. 4 is a section representing sulfur being dusted on the binder;

Fig. 5 is a section representing rubber applied to the binder on which sulfur has been dusted; and Fig. 6 is a section representing the assembled product being subjected to heat and pressure.

Referring to the drawing, sulfur 11 which will not pass a 200 mesh screen but will pass a 30 mesh screen is being fed from the hopper 10 into the binder 12. The binder is stirred with the stirrer 13 which incorporates the sulfur uniformly throughout the binder but does not appreciably decrease the particle size of the sulfur. The binder is then applied to the metal 14 and covered with the rubber 15. The assemblage is then heated in the mold 16 in the press 17 until the rubber is vulcanized and firmly adhered to the metal. In another embodiment, sulfur which will not pass a 200 mesh screen but will pass a 30 mesh screen is dusted through a duster 18 onto the binder 19, which has been spread upon the metal 20. The rubber 21 is then applied, and the assemblage is vulcanized under pressure in a heated mold.

The method used to improve the adhesion between brass and rubber may be cited as an illustration of a specific embodiment of my invention. Rubber stocks containing tetramethyl thiuram disulfide as the accelerator are particularly hard to adhere to brass. For a binder, rubber cement was used. Three batches of a stock containing rubber 100 parts by weight, tetramethyl thiuram disulfide 0.2 part, and zinc oxide 5.0 parts were prepared. The first batch was dissolved in benzene, spread on the brass, and dusted with a weight of 100 to 30 mesh sulfur amounting to 0.5 percent of the weight of rubber in the cement. The second batch was dissolved in benzene, mixed with 100 to 30 mesh sulfur whose weight was 0.5 percent of the weight of the rubber in the cement, and spread on the brass. The third batch was milled with 0.5 part by weight of 100 to 30 mesh sulfur, dissolved in benzene, and spread on the brass. All three samples were covered with a rubber stock containing rubber 100 parts by weight, tetramethyl thiuram disulfide 0.2 part, zinc oxide 5.0 parts, and sulfur 6.0 parts and cured for 20 minutes at 265° F. Excellent adhesion was obtained in the samples in which the sulfur had been dusted onto and mixed into the cement, but no adhesion occurred where the sulfur had been milled into the rubber before the cement was made. The milling seemed to have decreased the particle size of the sulfur too much for good adhesion to occur.

Although I have given a specific embodiment of my invention, it will be apparent that the invention is not limited thereto, but that various modifications may be made therein without departing from the spirit of the invention or from the scope of the appended claims. The same method is applicable to copper plate, cobalt plate, and other metallic surfaces. The term "binder" as employed in the appended claims is susceptible of many variations. The binder, for example, may be rubber cement, which is rubber dissolved in gasolene, benzene or other solvent; a metallic soap such as manganese linoleate or cobalt stearate; a mixture of rubber cement and a metallic soap; latex-hemoglobin; a resin such as cumar resin; a wax; an oil; asphalt; petrolatum; or a fatty acid such as stearic acid. The sulfur which is dusted on or incorporated into the binder may be sulfur ground to the proper particle size, or sulfur of the proper particle size adsorbed, with or without an introfier such as naphthalene, on carbon black, fossil flour, zinc oxide, or the like. The term "rubber" is likewise employed in the appended claims in a generic sense to include caoutchouc, both natural and synthetic, balata, gutta percha, rubber isomers, and like products whether or not admixed with fillers, pigments, antioxidants, or vulcanizing or accelerating agents.

I claim:

1. The method of adhering rubber to brass which comprises coating the surface of the brass with a binder into which has been incorporated without changing the particle size sulfur which will not pass a 100 mesh screen but will pass a 30 mesh screen, applying the rubber, and subjecting the assembled product to heat and pressure.

2. The method of adhering rubber to brass which comprises coating the surface of the brass with a binder, dusting onto the binder sulfur which will not pass a 100 mesh screen but will pass a 30 mesh screen, applying the rubber, and subjecting the assembled product to heat and pressure.

3. The method of adhering rubber to brass which comprises coating the surface of the brass with rubber cement into which sulfur which will not pass a 100 mesh screen but will pass a 30 mesh screen has been mixed without changing the particle size, applying the rubber, and subjecting the assembled product to heat and pressure.

4. The method of adhering rubber to brass which comprises coating the surface of the brass with cumar resin into which sulfur which will not pass a 100 mesh screen but will pass a 30 mesh screen has been mixed, applying the rubber, and subjecting the assembled product to heat and pressure.

5. The method of adhering rubber to brass which comprises coating the surface of the brass with rubber cement, dusting onto the rubber cement sulfur which will not pass a 100 mesh screen but will pass a 30 mesh screen, applying the rubber, and subjecting the assembled product to heat and pressure.

6. In a method of adhering rubber to a member of the class of metals consisting of brass, copper, and cobalt the step which consists in making available at the interface between the rubber and metal prior to vulcanization sulfur which will not pass a 200 mesh screen but will pass a 30 mesh screen.

7. The method of adhering rubber to a member of the class of metals consisting of brass, copper, and cobalt which comprises assembling successive layers of a metal, a binder associated with sulfur which will not pass a 200 mesh screen but will pass a 30 mesh screen, and a vulcanizable rubber composition, and subjecting the assemblage to heat and pressure.

HERSHEL W. GRINTER.

CERTIFICATE OF CORRECTION.

Patent No. 2,188,434. January 30, 1940.

HERSHEL W. GRINTER.

It is hereby certified that error appears in the printed specification of the above numbered patent requiring correction as follows: Page 2, second column, line 15, claim 4, after "mixed" and before the comma, insert --without changing the particle size--; and that the said Letters Patent should be read with this correction therein that the same may conform to the record of the case in the Patent Office.

Signed and sealed this 7th day of May, A. D. 1940.

(Seal)
Henry Van Arsdale,
Acting Commissioner of Patents.